UNITED STATES PATENT OFFICE.

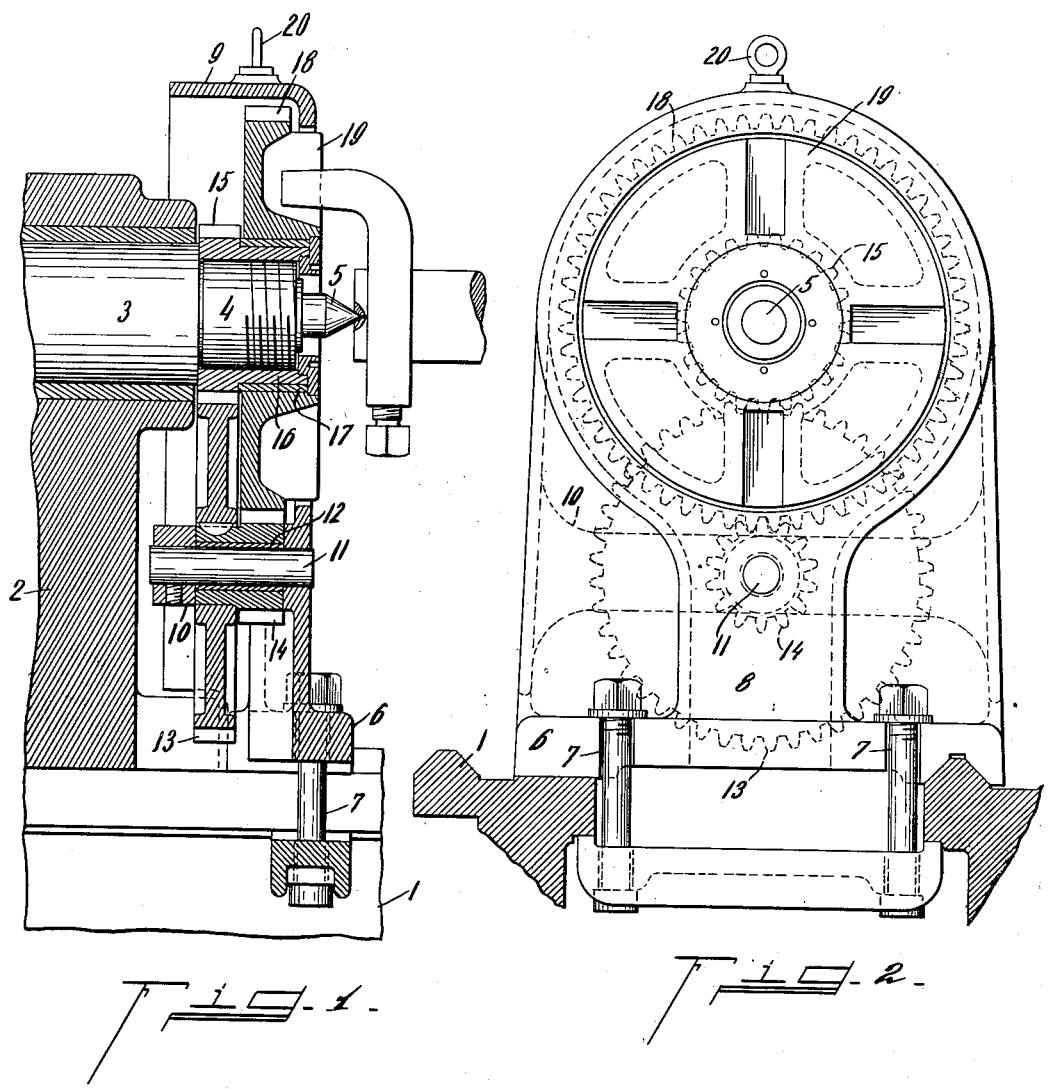

WILLIAM SCHELLENBACH, OF HARTWELL, OHIO.

SPINDLE-NOSE APPLIANCE FOR MACHINE-TOOLS.

1,070,990.  Specification of Letters Patent.  Patented Aug. 19, 1913.

Application filed May 19, 1913. Serial No. 768,579.

*To all whom it may concern:*

Be it known that I, WILLIAM SCHELLENBACH, a citizen of the United States, residing at Hartwell, in the county of Hamilton and State of Ohio, have invented certain new and useful Improvements in Spindle-Nose Appliances for Machine-Tools, of which the following is a specification.

My invention relates to a face-plate appliance for the driven spindle-nose of a machine tool.

The object of the invention is to rotate the face-plate and spindle at materially differential speeds.

Preferably I contemplate the employment of a speed reduction compound gear train, with the spindle-nose as the driving, and the face-plate as the driven element. This appliance must be compact, conveniently attached and detached, and is intended for certain special classes of work, such as forming coarse pitch screw-threads, my appliance enabling the transposition of relative work and tool speeds ordinarily obtaining, whereby the tool travels relatively fast as the supported work rotates relatively slowly. The gears and face-plate are encompassed within the lateral dimensions of the spindle-nose, the spindle end projecting concentrically through the face-plate, so as to preserve the normal distance between centers.

The features of my invention will be more fully set forth in the description of the accompanying drawings, forming a part of this specification, in which:—

Figure 1 is a central vertical longitudinal section through my improvement applied to a lathe spindle. Fig. 2 is a front elevation partly in section.

The preferred embodiment of my invention is disclosed in connection with a conventional engine lathe, in which 1 represents the bed, 2 the head-stock, 3 the spindle, having bearings in the head-stock, 4 the screw-threaded spindle-nose, and 5 the spindle or center end.

The supporting frame is an integral structure forming a housing for the rotary elements of the appliance, the base 6 thereof being secured by bolts 7 to the bed of the lathe in front of the head-stock. The front web member 8 is formed with a circumferential front opening exposing the face-plate, the outer web member 9 peripherally houses the gears and face-plate, and the cross bar 10 reinforces the lower portion of the member 9 in rear of the lower portion of the member 8. Secured to the members 8 and 10 is a fixed shaft 11 between the bed and spindle nose, upon which is placed a bearing-sleeve 12 and a compound gear comprising the gear 13 and pinion 14, which compound gear turns as a unit on the bearing sleeve within the space formed between the frame pieces 8 and 10, the lateral dimensions of said compound gear being approximately the same as the spindle nose, with which said compound gear is vertically alined. Screw-threaded upon the spindle-nose is a pinion 15 meshing with gear 13, said pinion being formed with a forwardly extended hub 16, upon which is placed a bearing sleeve 17, a gear 18 turning on said bearing sleeve 17 and being intermeshed with the pinion 14 of the compound gear. The face-plate 19 is secured upon the front face of the gear 18, the work supporting face of said plate being exposed through the circumferential opening of the frame 8 and the spindle end 5 projecting concentrically through the gears 15, 18 and the face-plate. Preferably the frame member 9 is provided with the handle 20. As the pinion 15 is fixed relative to the spindle-nose, the gear 18 being loose relative to the spindle-nose, and meshing respectively with the gear 13 and pinion 14 constituting the compound unitary gear, it is obvious that the spindle-nose which is normally the driven member of the head-stock, becomes the driving member for my appliance, the face plate being the driven element, and that from the relative diameters and entraining of the pinion and gears the face-plate will be rotated at a greatly reduced speed as compared to the spindle-nose rotation. The speed reduction ratio will be computed to provide any desired relative travel for the tool and work-supporting face-plate.

The simplicity and convenience of attachment of the appliance are obvious, and it is also apparent that the appliance enables the ready accomplishment of special classes of work for which the ordinary engine-lathe has no provision. It is also obvious that this appliance can be used in connection with or as an accessory to all ordinary types of engine lathes.

Having described my invention, I claim:—

1. A face-plate appliance for the driven spindle-nose of a machine tool, comprising a frame secured to the bed in front of the head-stock; a compound gear having bearings in the frame under and in vertical alinement with the spindle-nose, a fixed and a loose gear on the spindle-nose in train with the frame compound gear, and a face-plate secured to the loose gear through which the front end of the spindle projects.

2. A face-plate appliance for the driven spindle-nose of a machine tool, comprising a frame secured to the bed in front of the head-stock, a compound gear having bearings in the frame under and in vertical alinement with the spindle-nose, a fixed and a loose gear on the spindle-nose in train with the frame compound gear, a face-plate secured to the loose gear through which the front end of the spindle projects, and said frame constituting a peripheral housing for the rotary elements of the appliance.

In witness whereof, I hereunto subscribe my name, as attested by the two subscribing witnesses.

WILLIAM SCHELLENBACH.

Witnesses:
OLIVER B. KAISER,
CLARENCE B. FOSTER.